No. 894,711. PATENTED JULY 28, 1908.
T. M. WORCESTER.
CLAMP RIB FOR IRONWORK.
APPLICATION FILED JAN. 6, 1908.
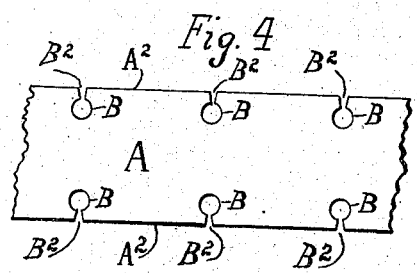
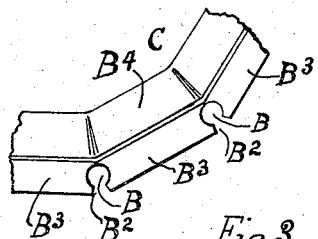
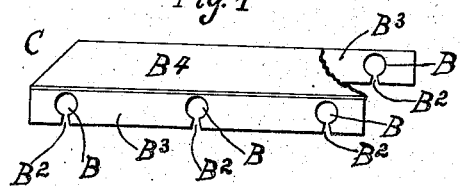
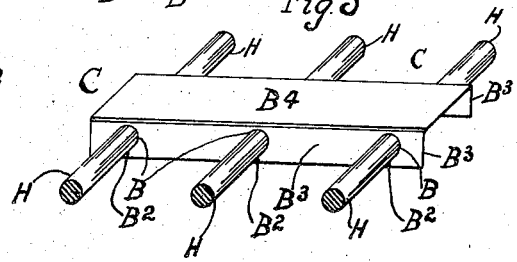
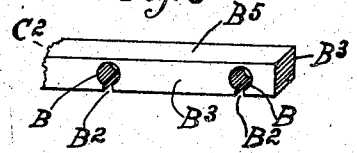
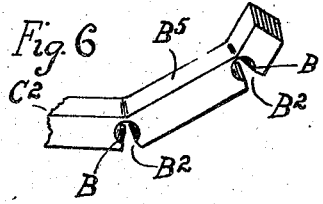
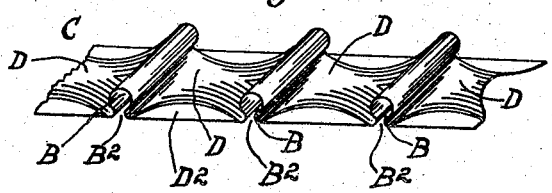
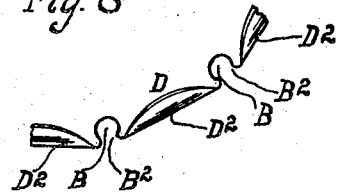
Witnesses
Inventor
Thomas M. Worcester
By Wm. Hubbell Fisher,
Attorney.

UNITED STATES PATENT OFFICE.

THOMAS M. WORCESTER, OF CINCINNATI, OHIO, ASSIGNOR TO THE BROMWELL BRUSH AND WIRE GOODS COMPANY, OF CINCINNATI, OHIO, A CORPORATION OF OHIO.

CLAMP-RIB FOR IRONWORK.

No. 894,711.  Specification of Letters Patent.  Patented July 28, 1908.

Application filed January 6, 1908. Serial No. 409,548.

*To all whom it may concern:*

Be it known that I, THOMAS M. WORCESTER, a citizen of the United States, and a resident of the city of Cincinnati, in the county of Hamilton and State of Ohio, have invented certain new and useful Improvements in Clamp-Ribs for Various Descriptions of Ironwork, of which the following is a specification.

The several features of my invention and the various advantages resulting from their use conjointly or otherwise will be apparent from the following description and claims.

In the accompanying drawings making a part of this specification,—Figure 1 is a view in perspective of a short length of a sheet metal clamp constructed according to my invention. One corner of the clamp is partly broken away to illustrate the construction of the opposite side of the clamp. Fig. 2 is a view in perspective of this clamp bent so as to receive the rods of the structure it is to hold. Fig. 3 is a perspective view of this clamp when the rods it is to hold are in place, and the clamp is bent back to the position shown in Fig. 1,—the combined structure being complete. Fig. 4 is a plan view, or a plain face view of a sheet metal blank showing how the holes and slits of the clamp rib shown in Figs. 1, 2 and 3 are formed therein. Fig. 5 represents a perspective view of a short length of the clamp when made out of solid bar metal. Fig. 6 is a side view of such bar bent to receive the rods it is meant to include. Fig. 7 is a view, in perspective, of a clamp formed out of sheet metal according to my invention and corrugated between the places which respectively receive the rods. Fig. 8 is a side elevation of the corrugated clamp shown in Fig. 7, the clamp bent backward to receive the rods which are to be combined with it. Fig. 9 is a diagrammatic view illustrating curvatures of the clamp rib.

This invention is primarily intended to be used in constructions whereof wires or rods form a part. Among the many constructions of this sort may be mentioned for typical illustration: fences for various purposes,—such as for gardens, lawns, farms; concrete constructions; rat traps, mouse traps, and traps for many other animals.

I will now proceed to describe my invention in detail.

In Figs. 1, 2, 3 and 4, I illustrate the construction of my clamp rib, when made from sheet metal. The sheet metal blank A of the proper width and length is provided. Near each side edge of the strip I punch in the strip, the holes B, at suitable distances apart, viz.: at such distances apart as the wires or rods to be held by the clamp are to be located in the structure for which they are designed. Each of the holes B is connected to the adjacent edge of the strip A by a slit or opening $B^2$, which is preferably larger at the free edge $A^2$ of the blank than where it joins the hole B. The edge portions of the strip A are now each bent at right angles to the main or central portion of the strip, producing a structure C, substantially as shown in Fig. 1, and having a back $B^4$, and side flanges or pieces $B^3$, $B^3$.

When the wires or rods are to be placed in the clamp rib, or the clamp rib is to be applied to the rods or wires H, H, H, etc., the clamp rib is bent backward as shown in Fig. 2. Then through a slit $B^2$ on one edge and through the corresponding slit $B^2$ on the opposite edge the wire is passed and is received into the respective holes B, B, of the respective edges. The rib C is then bent back so that its back portion and the side flanges are returned to their first position. Then the structure will appear as shown in Fig. 3. Of course the back C need not be bent absolutely straight. It may be left bent up somewhat as shown in dotted lines M of Fig. 9, or when the slits $B^2$ are made somewhat wide and especially made larger at the outer edge of the flange than at the hole B, the back can be much curved over as shown by the dotted lines N, Fig. 9. In this way, the clamp rib may the better be adapted to curved surfaces curving in the direction of the length of the rib.

In Fig. 5, I show a single strip of solid or bar metal $C^2$, through which is made a hole, preferably slightly smaller than the cross wires it is to hold. This hole B is made by a die punch, or by boring, that is, by any suitable means. These holes are preferably bored as near the face of the bar as the metal will stand without breaking in the bending. A slit $B^2$ duly connects the hole with one face of the bar. This slit will, when the said face is flat, extend across said face, which slit is on that side of the bar opposite to the back B⁵ of said bar. To receive the cross wire, the bar is bent back so as to open the slits, i. e. put the opposite faces of such slit wide enough apart to allow the rod or wire H to be readily received into its hole B,—see Fig. 6,—and then the clamp is bent back to substantially its first position with the wire or wires duly held therein.

Of course, the metal of the strip, especially if it be sheet metal, may be corrugated in different ways, and of different patterns. One kind of such corrugation is shown in Fig. 7,—such corrugation having been done by rollers. These latter designs shown in Figs. 7 and 8 require a raising of the metal between the clamps, so that the metal will bend in the circle and thus open to go over the cross wires. In the corrugations shown, the curved longitudinal reinforcement D of metal prevents bending of that part D² of the sheet which is between the clamps or bearings for the reception respectively of a wire or rod H when said clamps or bearings are opened to receive the rods or wires as shown in Fig. 8.

In the clamps respectively shown in Figs. 5 and 7, the slits B² are also preferably narrower where they join their respective holes B, than at their other or free ends.

It should be noted that not only in the bar, Fig. 5 but also in the sheet metal structure, the hole B is preferably of a slightly smaller diameter than the wire or rod it is to contain. Thus it will closely embrace said wire or rod and prevent it from slipping. In cases where the slipping of the wire relative to the clamp rib is not important, the hole may be left larger.

What I claim as new, and of my invention and desire to secure by Letters Patent, is:—

1. In a structure involving wires or rods held by cross-clamps or braces, the cross-clamp or rib provided with a hole of a size to closely embrace said wire, and with a slit extending from the hole to one edge or face of the clamp, the said hole being close to the rear or back of the clamp for enabling the clamp to be bent over back and the slits and the holes to be opened for the reception of the wires, and to be closed again, substantially as and for the purposes specified.

2. In a structure involving wires or rods held by cross-clamps or braces, the cross clamp or rib composed of sheet metal, whose side portions are bent in the same direction and at right angles to the plane of the back, these side portions being each provided with a hole near the back, and a slit extending from the hole to the free edge of the clamp, the device adapted to be bent back and the slits and holes opened for the reception of the wires, substantially as and for the purposes specified.

3. In a structure involving wires or rods held by cross clamps or braces, the cross clamp or rib provided with a hole of a size to embrace said wire and with a slit extending from the hole to one edge or face of the clamp, the slit enlarging in width from the hole to its other end, substantially as and for the purposes specified.

THOMAS M. WORCESTER.

Attest:
JOHN E. FITZPATRICK,
WM. HUBBELL FISHER.